United States Patent
Kitamura

(10) Patent No.: US 9,618,079 B2
(45) Date of Patent: Apr. 11, 2017

(54) BALANCER DEVICE FOR INTERNAL COMBUSTION ENGINE AND ITS ASSEMBLY METHOD

(71) Applicant: HITACHI AUTOMOTIVE SYSTEMS, LTD., Hitachinaka-shi, Ibaraki (JP)

(72) Inventor: Masaharu Kitamura, Atsugi (JP)

(73) Assignee: HITACHI AUTOMOTIVE SYSTEMS, LTD., Hitachinaka-Shi (JP)

( * ) Notice: Subject to any disclaimer, the term of this patent is extended or adjusted under 35 U.S.C. 154(b) by 169 days.

(21) Appl. No.: 14/481,416

(22) Filed: Sep. 9, 2014

(65) Prior Publication Data

US 2015/0075477 A1     Mar. 19, 2015

(30) Foreign Application Priority Data

Sep. 13, 2013   (JP) .................................. 2013-189932

(51) Int. Cl.
  *F02B 75/06*   (2006.01)
  *F16F 15/26*   (2006.01)
  *F02B 75/20*   (2006.01)
  *F02B 67/00*   (2006.01)

(52) U.S. Cl.
  CPC ............ *F16F 15/267* (2013.01); *F02B 67/00* (2013.01); *F02B 75/06* (2013.01); *F02B 75/20* (2013.01); *F16F 15/264* (2013.01); *F16F 15/265* (2013.01); *Y10T 29/49231* (2015.01)

(58) Field of Classification Search
  CPC ....... F16F 15/264; F16F 15/265; F02B 75/20; F02B 75/06; F02B 67/00; F16B 39/22

USPC ....................................................... 123/192.2
  See application file for complete search history.

(56) References Cited

U.S. PATENT DOCUMENTS

| | | | |
|---|---|---|---|
| 2003/0106518 A1* | 6/2003 | Purcell | F01M 11/02 123/192.2 |
| 2003/0111037 A1* | 6/2003 | Takahashi | F01M 1/02 123/192.2 |
| 2011/0247333 A1 | 10/2011 | Srinivasan et al. | |

FOREIGN PATENT DOCUMENTS

| | | |
|---|---|---|
| JP | 2007-024188 A | 2/2007 |
| JP | 2009-162307 A | 7/2009 |
| JP | 2011-220339 A | 11/2011 |

* cited by examiner

*Primary Examiner* — Hung Q Nguyen
*Assistant Examiner* — Charles Brauch
(74) *Attorney, Agent, or Firm* — Foley & Lardner LLP

(57) ABSTRACT

A balancer device for an internal combustion engine includes upper and lower housings made of aluminum alloy. The upper housing includes a leg part fixed to the engine. The lower housing is coupled to the upper housing by tightening bolts. A pair of balancer shafts are rotatably supported by the upper and lower housings. A positioning pin is disposed at a distal end portion of the leg part for positioning the upper housing with respect to the engine by positional correspondence to a positioning hole of the engine when the tightening bolts are tightened. The leg part is inclined outwardly with respect to a body of the upper housing such that a distal end of the positioning pin is located outside of a proximal end of the leg part with respect to the body of the upper housing when the tightening bolts are loosened.

15 Claims, 6 Drawing Sheets

BALANCER DEVICE FOR INTERNAL COMBUSTION ENGINE AND ITS ASSEMBLY METHOD

BACKGROUND OF THE INVENTION

The present invention relates to a balancer device for reducing a secondary vibration of an internal combustion engine due to its rotation, wherein the balancer device is provided at a lower part of a cylinder block or the like of the internal combustion engine.

Japanese Patent Application Publication No. 2009-162307 discloses a balancer device attached to a lower part of a cylinder block of an internal combustion engine. The balancer device includes a balancer housing, and a pair of balancer shafts including a drive shaft and a driven shaft. The balancer housing is composed of an upper housing and a lower housing by coupling with tightening bolts. The drive shaft and the driven shaft are rotatably supported inside the balancer housing, and configured to be rotated by rotation of a crankshaft to cancel a secondary vibration of the internal combustion engine.

The balancer housing includes a plurality of leg parts which are integrally formed with an upper end part of an outer periphery side of the upper housing. The leg parts are attached to the internal combustion engine by the tightening bolts, while being positioned by a ladder frame of the cylinder block.

SUMMARY OF THE INVENTION

In such a balancer device as disclosed by Japanese Patent Application Publication No. 2009-162307, the upper housing and the lower housing are generally formed of aluminum alloy in response to a request of reducing weight of the balancer housing.

However, the configuration that the upper housing and the lower housing are formed of aluminum alloy, and coupled by the tightening bolts including one located between the pair of balancer shafts, may cause the upper and lower housings to be slightly bended and deformed inward by the axial force of the tightening bolt, and thereby cause a distal end portion of each of the leg parts of the upper housing to be inclined inward toward each other.

This may cause that positioning pins provided at distal end portions of the leg parts are shifted from their normal positions, and thereby make it impossible to make the positioning pins correspond in position to positioning holes of the cylinder block. This makes it hard to position and attach the balancer housing to the cylinder block.

In view of the foregoing, it is an object of the present invention to provide a balancer device for an internal combustion engine and its assembly method, with which the accuracy of positioning between a housing of the balancer device and a cylinder block of the internal combustion engine can be enhanced, wherein the housing is made of aluminum alloy.

According to one aspect of the invention, a balancer device for an internal combustion engine, the balancer device comprises: an upper housing including a plurality of leg parts configured to be fixed to the internal combustion engine, wherein the upper housing is made of aluminum alloy; a lower housing configured to be coupled to the upper housing by a plurality of tightening bolts, wherein the lower housing is made of aluminum alloy; a pair of balancer shafts disposed in an internal space formed between the upper housing and the lower housing, and rotatably supported through bearings with respect to the upper housing and the lower housing; and a positioning pin disposed at a distal end portion of a corresponding one of the leg parts, and configured to extend longitudinally of the corresponding leg part, and position the upper housing with respect to the internal combustion engine by positional correspondence to a positioning hole of the internal combustion engine under a first condition that the tightening bolts are tightened to couple the lower housing to the upper housing; wherein the corresponding leg part is inclined outwardly with respect to a body of the upper housing such that a distal end portion of the positioning pin is located outside of a proximal end portion of the corresponding leg part with respect to the body of the upper housing under a second condition that the tightening bolts are loosened. The balancer device may be configured so that: each of the balancer shafts includes a counter weight at an outer periphery thereof; the upper housing is provided with a first reinforcement rib; and the first reinforcement rib is located to correspond to the counter weights of the balancer shafts in an axial direction of the balancer shafts, and extend between the balancer shafts in a direction perpendicular to the axial direction of the balancer shafts. The balancer device may be configured so that the first reinforcement rib is located to correspond substantially to a central part of the counter weights of the balancer shafts in the axial direction. The balancer device may be configured so that the plurality of tightening bolts are located outside of the balancer shafts in the perpendicular direction and in different positions in the axial direction. The balancer device may be configured so that the first reinforcement rib is located at a part of the upper housing surrounded by the plurality of leg parts. The balancer device may be configured so that at least one of the tightening bolts is arranged between the pair of balancer shafts, and two of the tightening bolts are arranged on corresponding outsides of the balancer shafts. The balancer device may be configured so that the upper housing is provided with a second reinforcement rib at an outer end portion thereof in a direction in which the at least one and the two of the tightening bolts are arranged. The balancer device may be configured so that the second reinforcement rib is located close to one of the leg parts of the upper housing. The balancer device may be configured so that: a first one of the leg parts is arranged at a first outer end portion of the upper housing in a width direction of the upper housing; a second one of the leg parts is arranged at a second outer end portion of the upper housing in a width direction of the upper housing, wherein the second outer end portion is opposite to the first outer end portion; and the second reinforcement rib include a rib part located close to a side portion of the first leg part and a rib part located close to a side portion of the second leg part. The balancer device may be configured so that: the leg parts include a first leg part and a second leg part; the first leg part is located outside of a first one of the balancer shafts in an axial direction of the balancer shafts; the second leg part is located outside of a second one of the balancer shafts in the axial direction of the balancer shafts; and the positioning pin is provided at the distal end portion of each of the first and second leg parts. The balancer device may be configured so that shifting from the second condition to the first condition causes the distal end portion of the positioning pin to be displaced with respect to the body of the upper housing by about 10 to 30 micrometers. The balancer device may be configured so that: a lower surface of a cylinder block of the internal combustion engine is provided with a bearing cap bearing a crankshaft; and the plurality of leg parts are configured to be fixed to portions of the cylinder block without interference with the bearing cap. The balancer device may be configured so that: a first one and a second one of the leg parts are arranged on a first side of the crankshaft; the first and second leg parts are arranged in different positions in an axial direction of the balancer shafts; a third one and a fourth one of the leg parts are arranged on a second side of the crankshaft opposite to the first side; and the third and fourth leg parts are arranged in different positions in the axial direction of the balancer shafts. The balancer device may be configured so that: each leg part includes a cylindrical hollow extending inside thereof in an axial direction thereof; and the upper housing is configured to be fixed to the internal combustion engine by mounting bolts, wherein each mounting bolt is inserted in the hollow of a corresponding one of the leg parts.

According to another aspect of the invention, a balancer device for an internal combustion engine, the balancer device comprises: an upper housing including a plurality of leg parts configured to be fixed to the internal combustion engine, wherein the upper housing is made of aluminum alloy; a lower housing configured to be coupled to a lower part of the upper housing by a plurality of tightening bolts, wherein the lower housing is made of aluminum alloy; a pair of balancer shafts disposed in an internal space formed between the upper housing and the lower housing, and rotatably supported with respect to the upper housing and the lower housing; and positioning members each of which is disposed at a distal end portion of a corresponding one of the leg parts, and configured to extend longitudinally of the corresponding leg part, and position the upper housing with respect to the internal combustion engine by positional correspondence to a corresponding positioning part of the internal combustion engine; wherein at least a first one of the tightening bolts is disposed between the balancer shafts; each positioning member is configured to correspond in position to the corresponding positioning part of the internal combustion engine under a first condition that the first tightening bolt is tightened; and at least one of the positioning members is configured to fail to correspond in position to the corresponding positioning part of the internal combustion engine under a second condition that the first tightening bolt is loosened.

According to a further aspect of the invention, an assembly method for a balancer device for an internal combustion engine, the balancer device including: an upper housing including a plurality of leg parts configured to be fixed to the internal combustion engine, wherein the upper housing is made of aluminum alloy; a lower housing configured to be coupled to a lower part of the upper housing by a plurality of tightening bolts, wherein the lower housing is made of aluminum alloy; a pair of balancer shafts disposed in an internal space formed between the upper housing and the lower housing, and rotatably supported with respect to the upper housing and the lower housing; and positioning pins each of which is disposed at a distal end portion of a corresponding one of the leg parts, and configured to extend longitudinally of the corresponding leg part, and position the upper housing with respect to the internal combustion engine by positional correspondence to a corresponding positioning hole of the internal combustion engine; the assembly method comprises: a first operation of coupling the lower housing to the upper housing by tightening the tightening bolts; a second operation of drilling a press-fit hole in the distal end portion of each corresponding leg part, after the first operation; and a third operation of inserting each positioning pin into the corresponding positioning hole through the corresponding leg part, with holding a part of the each positioning pin press-fitted in the corresponding press-fit hole, after the second operation.

DETAILED DESCRIPTION OF THE INVENTION

In the present embodiment, a balancer device is applied to an in-line four-cylinder gasoline internal combustion engine.

Figure 1:
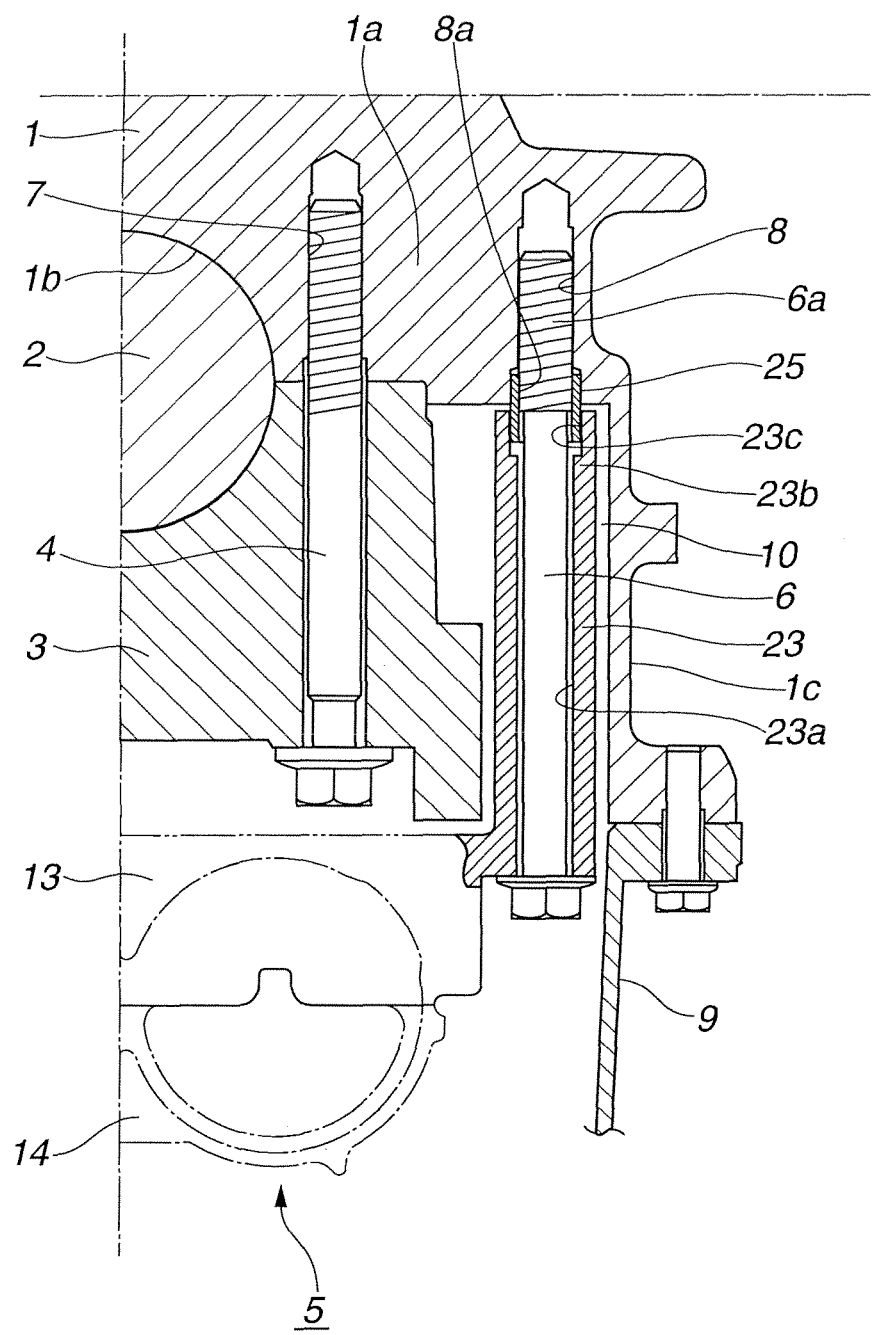
FIG. 1 is a partial sectional view of a balancer device for an internal combustion engine according to an embodiment of the present invention in a state that the balancer device is assembled to a cylinder block of the internal combustion engine.
Figure 2:
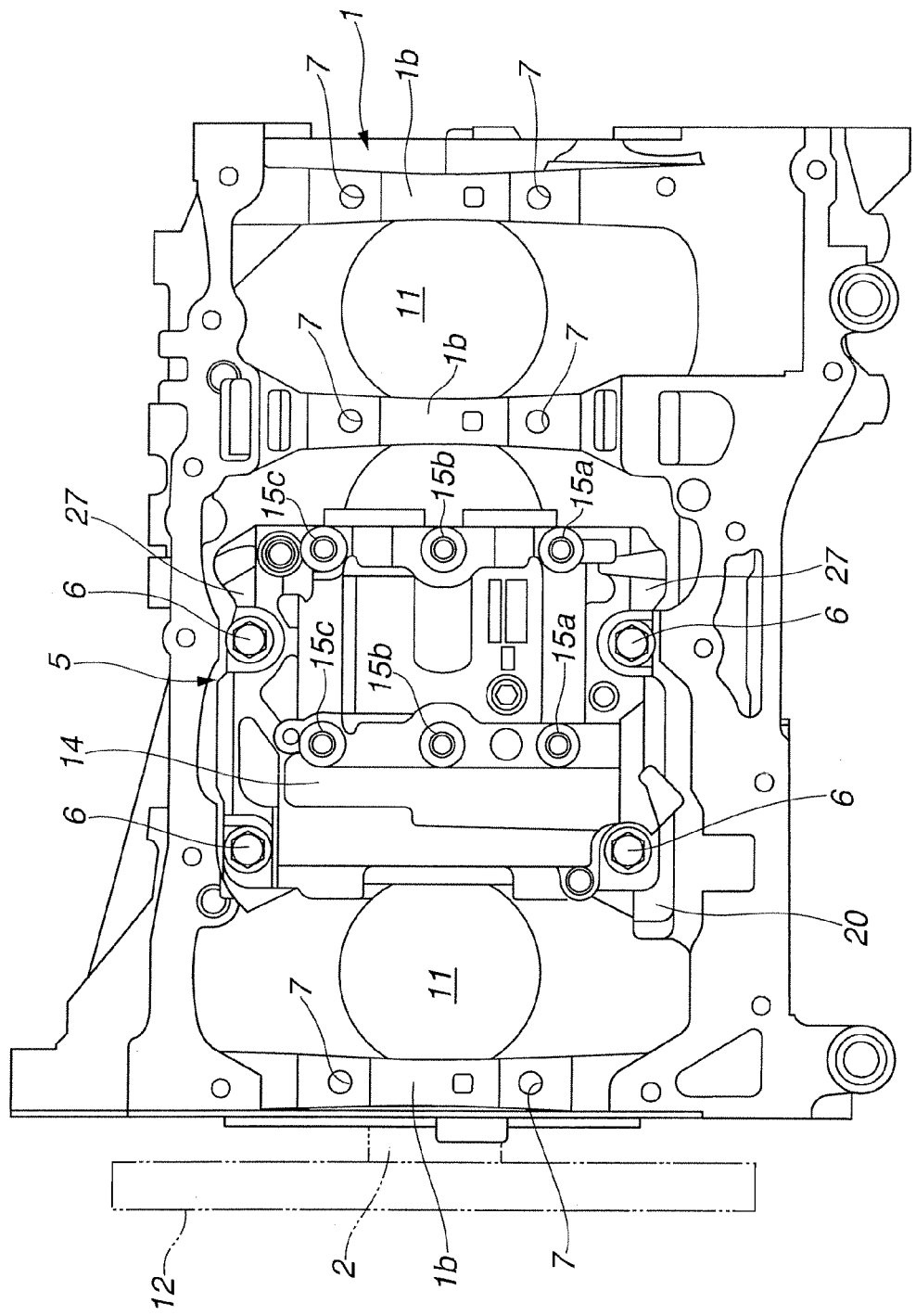
FIG. 2 is a bottom view of the balancer device in the state that the balancer device is assembled to the cylinder block.

As shown in FIGS. 1 and 2, the internal combustion engine includes a cylinder block 1 made of aluminum alloy, and five bearing caps 3 are fixed to a lower part 1a of cylinder block 1 by respective fixing bolts 4. Each bearing cap 3 includes a bearing which bears a crankshaft 2 in collaboration with a corresponding bearing groove 1b formed in an under surface of lower part 1a of cylinder block 1. A balancer device 5 is located below bearing caps 3, and assembled and fixed to lower part 1a of cylinder block 1 by mounting bolts 6.

Cylinder block 1 includes a skirt part 1c, which serves as a crank case, and is formed integrally with a lower end of an outer periphery of lower part 1a. Lower part 1a of cylinder block 1 is formed therein with first female screw holes 7 and second female screw holes 8 which extend upward in a vertical direction of cylinder block 1 from the under surface. Each first female screw hole 7 receives insertion of fixing bolt 4 from the under surface. Each second female screw hole 8 receives insertion of mounting bolt 6 from the under surface.

A space 10 is formed between skirt part 1c of lower part 1a of cylinder block 1 and bearing caps 3. As described below, four leg parts 21, 22, 23 and 24 of balancer device 5 are inserted and arranged in space 10, for fixing to cylinder block 1.

An oil pan 9 is fixed to a lower end part of skirt part 1c, and is arranged to cover a lower side of balancer device 5.

As shown in FIG. 2, cylinder bores 11 are formed inside the cylinder block 1, and a flywheel 12 is provided at a rear end part of crankshaft 2.

As shown in FIGS. 3 to 6, balancer device 5 includes an upper housing 13, a lower housing 14, a pair of balancer shafts (i.e. a drive shaft 16 and a driven shaft 17), and interlocking gears 18 and 19. Upper housing 13 is made of aluminum alloy, and fixed through the mounting bolts 6 to lower part 1a of cylinder block 1. Lower housing 14 is also made of aluminum alloy, and coupled by six tightening bolts 15a, 15b, 15c to a lower part of upper housing 13. Drive shaft 16 and driven shaft 17 are disposed and rotatably supported in an internal space between housings 13 and 14, and arranged to extend in a longitudinal direction of the internal combustion engine. Interlocking gears 18 and 19 are fixed to rear end parts of drive shaft 16 and driven shaft 17 respectively, and are of a helical gear type, and include teeth meshing with each other.

Figure 3:
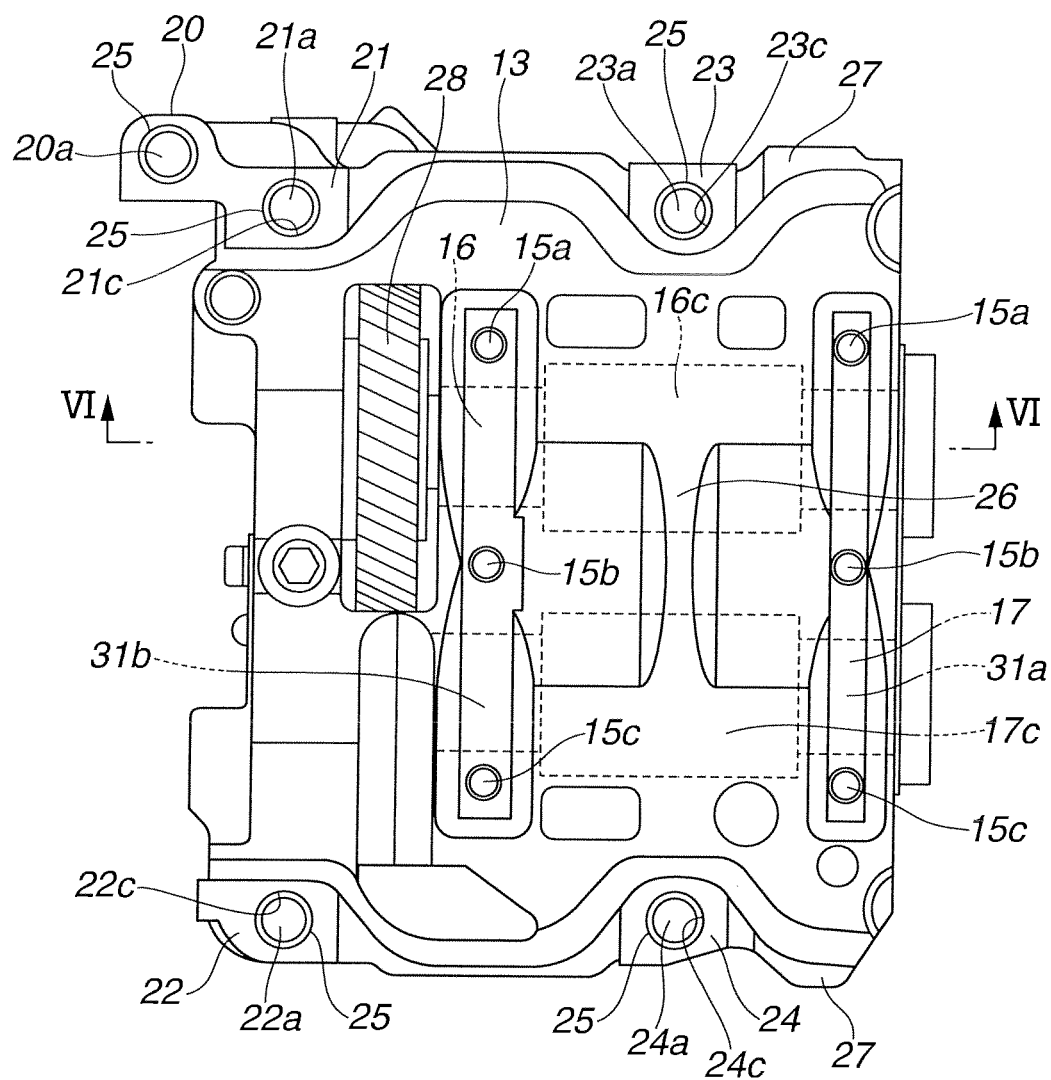
FIG. 3 is a plan view of the balancer device.
Figure 4:
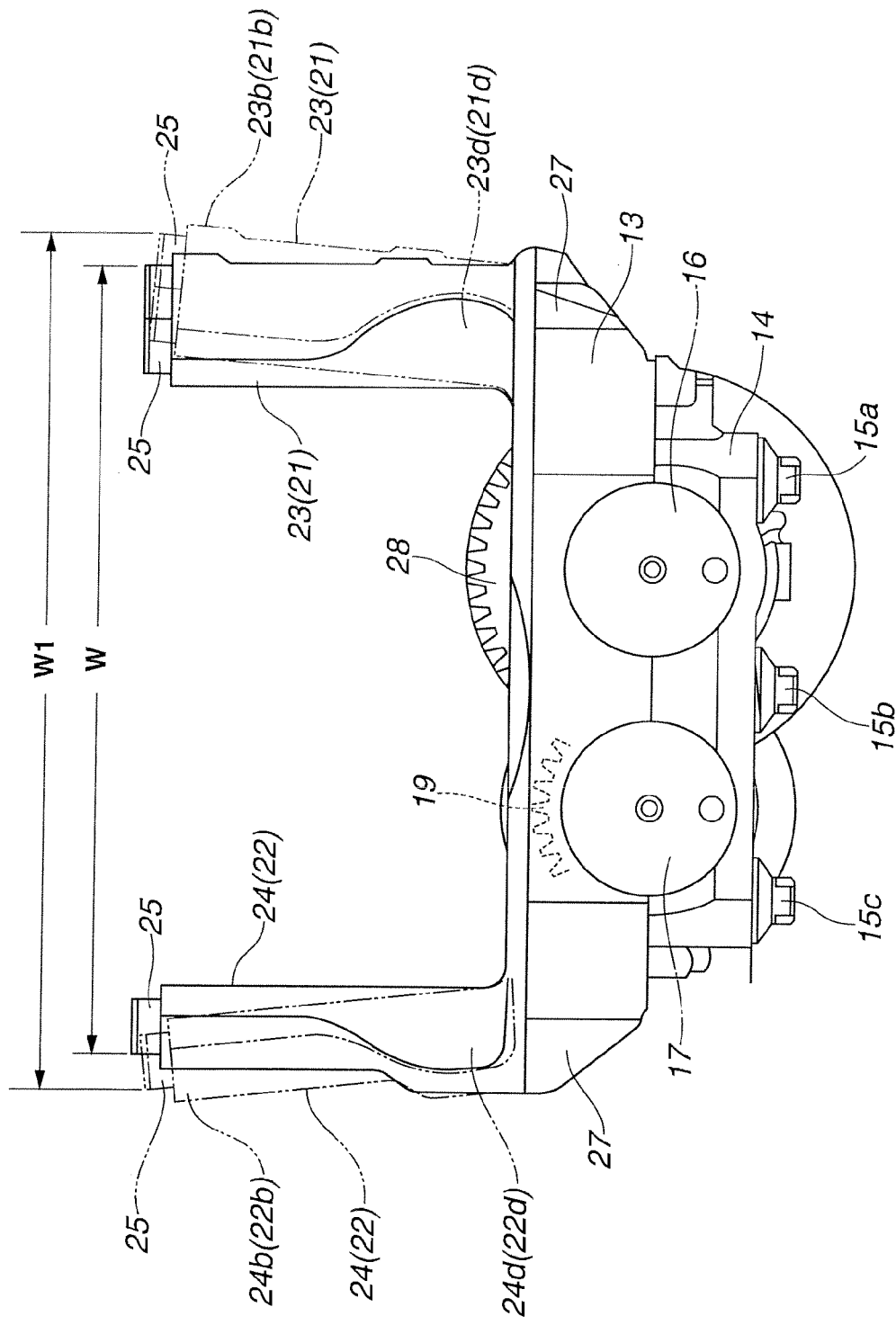
FIG. 4 is a front view of the balancer device.

As shown in FIGS. 3 and 4, upper housing 13 has a substantially rectangular shape in plan view, and is formed integrally with four leg parts 21, 22, 23 and 24. Leg parts 21 and 22 are located at end portions of a first longitudinal end part of the upper surface of upper housing 13 in its width direction, whereas leg parts 23 and 24 are located at end portions of a second longitudinal end part of the upper surface of upper housing 13 in its width direction.

Each of four leg parts 21, 22, 23 and 24 is formed in a substantially rectangular column shape, extending relatively long toward cylinder block 1. The length of each leg part is set to about 90 millimeters. Each leg part 21, 22, 23, 24 is formed with a bolt insertion hole 21a, 22a, 23a, 24a extending through the inside thereof in the longitudinal direction thereof, wherein four tightening bolts 6 are inserted in corresponding bolt insertion holes 21a, 22a, 23a, 24a.

Each of four leg parts 21, 22, 23 and 24 is formed with press-fit holes 21c, 22c, 23c and 24c respectively to press-fit and fix about half of a corresponding cylindrical positioning pin 25 inside an upper end part 21b, 22b, 23b, 24b of respective bolt insertion hole 21a, 22a, 23a, 24a.

As shown in FIGS. 2 and 3, a front end portion of one leg part 21, which is located outside of a body of upper housing 13, is formed integrally with a positioning boss part 20. Similar to leg parts 21, 22, 23 and 24, positioning boss part 20 is formed with a press-fit hole 20a extending from an upper surface thereof in a longitudinal direction thereof, wherein press-fit hole 20a presses-fits and fixes about half of cylindrical positioning pin 25 inside an upper end part of positioning boss part 20.

Figure 5:
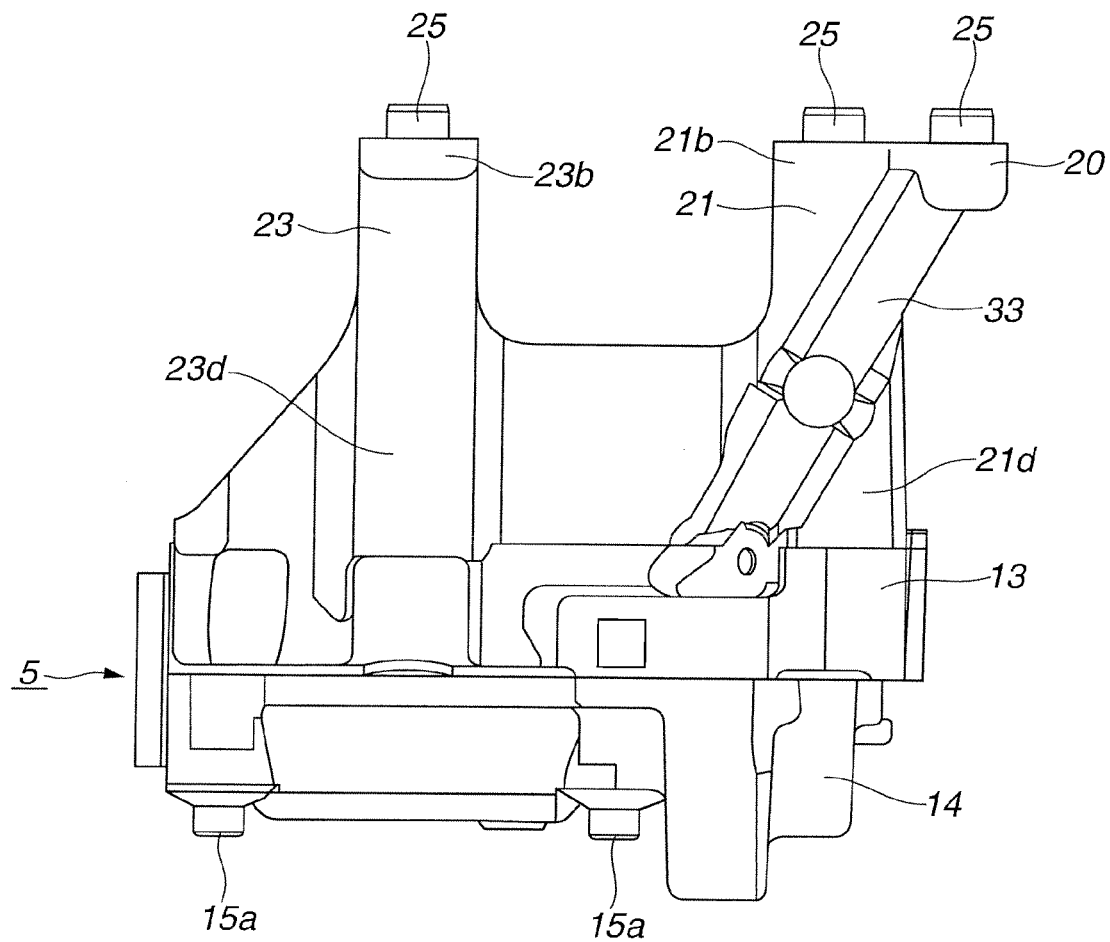
FIG. 5 is a side view of the balancer device.

As shown in FIG. 5, a lower end part of positioning boss part 20 is integrally coupled to an upper end part of a passage constitution part 33 including an oil passage inside thereof, wherein passage constitution part 33 is provided at an outer surface of one leg part 21, and is inclined outwardly with respect to the body of upper housing 13, and extends from an upper part of upper housing 13.

As shown in FIG. 1, each positioning pin 25 is served for positioning, wherein an upper end part thereof is inserted into a corresponding cylindrical positioning hole 8a respectively, which is formed inside a lower end part of second female screw hole 8 of cylinder block 1.

The entire balancer device 5 is attached and fixed to lower part 1a of cylinder block 1 through upper housing 13 by tightening a distal end portion 6a of each mounting bolt 6 to second female screw hole 8.

As shown in FIG. 3, upper housing 13 is integrally provided with a first reinforcement rib 26, which is located to correspond to a substantially central part in an axial direction of counter weights 16c and 17c. Counter weights 16c and 17c are integrally provided on both shafts 16 and 17 of the upper surface of upper housing 13. First reinforcement rib 26 is formed in a substantially rectangular shape and extends between counter weights 16c and 17c in a direction perpendicular to the axial direction of counter weights 16c and 17c.

Second reinforcement ribs 27 and 27 are integrally provided at side portions of root parts 23d and 24d respectively, which are located at root parts of two leg parts 23 and 24 respectively at the front end side of upper housing 13.

As shown in FIG. 2, lower housing 14 is formed in a rectangular box shape substantially similar to upper housing 13.

Figure 6:
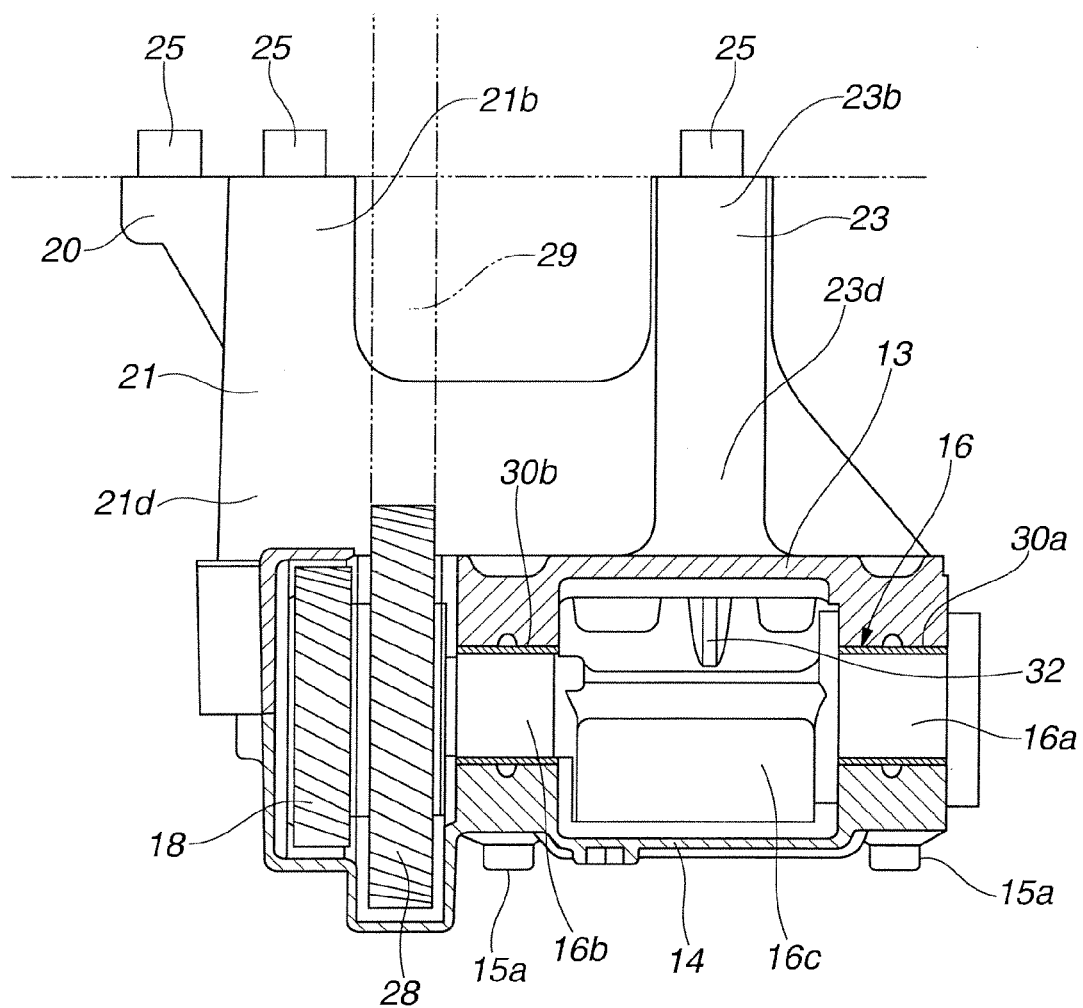
FIG. 6 is a sectional view of the balancer device taken along line VI-VI in FIG. 3.

As shown in FIG. 6, drive shaft 16 is fixed to a drive gear 28 at a rear end part thereof. Drive gear 28 receives input of a driving torque from a crank gear 29 fixed to crankshaft 2. Driven shaft 17 is driven through both interlocking gears 18 and 19 and drive gear 28 by drive shaft 16.

As shown in FIG. 6, drive shaft 16 includes large diameter journal parts 16a and 16b. Large diameter journal parts 16a and 16b are formed at two positions in an axial direction of drive shaft 16 and are rotatably supported by front and rear bearings 30a and 30b located between upper housing 13 and lower housing 14 and arranged.

Each of bearings 30a and 30b receives introduction of a lubrication oil through an oil passage formed in housings 13 and 14 and respective grooves formed on inner peripheral surfaces of bearings 30a and 30b. Counter weight 16c is integrally provided between journal parts 16a and 16b.

As shown in FIG. 6, a third reinforcement rib 32 is integrally provided on an inner surface of a side wall of upper housing 13.

Driven shaft 17 is rotatably supported by front and rear bearings 31a and 31b at its journal portions not shown similar to drive shaft 16, and integrally provided with counter weight 17c located between both journal parts.

Both shafts 16 and 17 are configured to rotate twice per one rotation of crankshaft 2.

Six tightening bolts 15a, 15a, 15b, 15b, 15c and 15c couple lower housing 14 to upper housing 13, as described above. One tightening bolt 15b is arranged in a central part located between bearings 30a and 31a, and the other tightening bolt 15b is arranged in a central part located between bearings 30b and 31b. Four tightening bolts 15a, 15a, 15c and 15c are arranged respectively at both end parts of shafts 16 and 17 in the direction perpendicular to the axial direction of shafts 16 and 17, in two rows and in parallel. Six tightening bolts 15a, 15a, 15b, 15b, 15c and 15c surely couple both housing 13 and 14 by respective bolt axial forces, and also stably and surely hold each of bearings 30a, 30b, 31a and 31b located between housings 13 and 14 at both sides of bearings 30a, 30b, 31a and 31b in the vertical direction of housings 13 and 14.

Leg parts 21 and 23 face leg parts 22 and 24 respectively in a width direction of upper housing 13. As indicated by a two-dot chain line in FIG. 4, each of root parts 21d, 22d, 23d and 24d serves as a fulcrum, and each of distal end portions 21b, 22b, 23b and 24b is displaced to form a substantially V-shape and is inclined at a predetermined angle outwardly with respect to the body of upper housing 13 under a condition that six tightening bolts 15a, 15a, 15b, 15b, 15c and 15c are loosened. Thereby, each positioning pin 25, which is pressed-fitted and fixed to the corresponding distal end portion 21b, 22b, 23b, 24b in advance, is displaced outwardly with respect to the body of upper housing 13.

As indicated by a solid line in FIG. 4, each of root parts 21d, 22d, 23d, and 24d of leg parts 21, 22, 23 and 24, serves as a fulcrum, and each of distal end portions 21b, 22b, 23b, and 24b is reversely displaced inward with respect to the body of upper housing 13, and is formed to be substantially vertical with respect to the upper surface of upper housing 13, and then the inclined angle is small, under a condition that six tightening bolts 15a, 15a, 15b, 15b, 15c and 15c are tightened to couple upper housing 13 to lower housing 14.

As indicated by a two-dot chain line in FIG. 4, a width (W1) of upper housing 13 between the outer ends of leg parts 21 and 22 (or leg parts 23 and 24) before coupling of upper housing 13 and lower housing 14 wherein leg parts 21 and 22 (or leg parts 23 and 24) face one another in the width direction of upper housing 13 is set larger by about 10 to 30 micrometers than a normal width of upper housing indicated by a solid line.

Cylinder block 1 includes five positioning holes 8a. Two positioning holes 8a and 8a, which correspond to positioning pin 25 of positioning boss part 20 and positioning pin 25 of leg part 22 respectively, are used for positioning the upper housing 13 in its normal position with respect to cylinder block 1. Thereby, each of inner diameters of the two positioning holes 8a and 8a is set and formed to strictly correspond to an outer diameter of positioning pin 25. On the other hand, inner diameters of other three positioning holes 8a are formed relatively larger than outer diameters of other corresponding three positioning pins 25.

<Assembly Method for Balancer Device>

The following describes an assembly method for assembling the balancer device to cylinder block 1. Positioning pins 25 are pressed-fitted and fixed to respective press-fit holes 20a, 21c, 22c, 23c and 24c in advance. Press-fit holes 20a corresponds to positioning boss part 20 of upper housing 13. Press-fit holes 21c, 22c, 23c and 24c correspond to distal end portions 21b, 22b, 23b and 24b of leg parts 21, 22, 23 and 24 respectively. As indicated by a two-dot chain line in FIG. 6, with regard to leg parts 21, 22, 23 and 24 including positioning boss part 20, distal end portions 21b, 22b, 23b and 24b are displaced and inclined outwardly with respect to the body of upper housing 13 under this condition.

Thereafter, upper housing 13 is coupled to lower housing 14 by tightening the six tightening bolts 15a, 15a, 15b, 15b, 15c and 15c by the predetermined bolt axial force in the vertical direction of the body of housings 13 and 14, wherein shaft 16 of balancer device 5 is stored inside housings 13 and 14 through bearings 30a and 30b, wherein shaft 17 of balancer device 5 is stored inside housings 13 and 14 through bearings 31a and 31b.

Since upper housing 13 and lower housing 14 are made of aluminum alloy, both side parts of housings 13 and 14 are slightly curved and deformed upwardly thereof around six tightening bolts 15a, 15a, 15b, 15b, 15c and 15c by a tightening force of tightening bolts 15a, 15a, 15b, 15b, 15c and 15c, wherein one side part of housings 13 and 14 are provided with positioning boss part 20 and leg parts 21 and 23, wherein the other side of housings 13 and 14 are provided at leg parts 22 and 24. Thereby, as indicated by a solid line in FIG. 6, each of distal end portions 21b, 22b, 23b and 24b are slightly deformed inward with respect to the body of upper housing 13 and are substantially vertical with regard to the body of upper housing 13, wherein each of distal end portions 21b, 22b, 23b and 24b is located at distal end portion of each of leg parts 21, 22, 23 and 24 including positioning boss part 20.

Subsequently, positioning boss part 20 and each of leg parts 21, 22, 23 and 24 are inserted into space 10 of cylinder block 1, and each of positioning pins 25 is inserted into corresponding respective positioning hole 8a under a condition of supporting the entire balancer device 5. Positioning pins 25 and 25, which correspond to positioning boss part 20 and one leg part 22 respectively, are inserted into corresponding positioning holes 8a and 8a respectively, and positioning pins 25 of other leg parts 21, 23 and 24 are inserted into corresponding positioning holes 8a. Positioning of balancer device 5 with respect to lower part 1a of cylinder block 1 is thus completed.

Thereafter, each tightening bolt 6 is inserted into a respective one of bolt insertion holes 21a, 22a, 23a and 24a of leg parts 21, 22, 23 and 24, and is tightened into a corresponding one of second female screw holes 8 by a predetermined axial force. Assembling of balancer device 5 with respect to cylinder block 1 is thus completed.

According to the present embodiment, the feature that upper housing 13 and lower housing 14 of balancer device 5 are formed of aluminum alloy, serves to reduce the weight of the entire balancer device 15. Especially, in consideration of the amount of bending deformation when tightening bolts 15a, 15a, 15b, 15b, 15c and 15c are tightened to couple upper housing 13 to lower housing 14, positioning boss part 20 and each of leg parts 21, 22, 23 and 24 are formed so as to be inclined with respect to the body of upper housing 13 at the predetermined inclined angles. Thereby, when both upper housing 13 and lower housing 14 are tightened by an high axial force of tightening bolts 15a, 15a, 15b, 15b, 15c and 15c, each of leg parts 21, 22, 23 and 24 and positioning boss part 20 are displaced inward with respect to the body of upper housing 13, and the inclined angle becomes small, and each positioning pin 25 is located in its normal position. This serves to improve the accuracy of positioning of upper housings 13 and lower housing 14 (balancer device 5) with respect to cylinder block 1 during attachment to cylinder block 1, and thereby make the positioning operation easy, and improve the efficiency of assembling operation.

The feature that first reinforcement rib 26 formed at upper housing 13 enhances a coupling rigidity of the portion surrounded by bearings 30a, 31a, 30b and 31b, serves to stably bear the drive shaft 16 and driven shaft 17 by bearings 30a, 31a, 30b and 31b, and suppress the amount of bending deformation of both housings 13 and 14 inward toward to each other due to a tightening torque of each of tightening bolts 15a, 15a, 15b, 15b, 15c and 15c.

Since second reinforcement ribs 27 and 27 are provided in vicinity of side parts of each of leg parts 23 and 24, a coupling rigidity of upper housing 13 to cylinder block 1 by each mounting bolt 6 can also be heightened.

<Another Assembling Method>

The following describes another assembly method for assembling the balancer device 5 to cylinder block 1. First, press-fit holes 20a, 21c, 22c, 23c and 24c for press-fitting respective positioning pins 25 are drilled by a drill at the distal end portion of positioning boss part 20 and distal end portions 21b, 22b, 23b and 24b of leg parts 21, 22, 23 and 24 under a condition that tightening bolts 15a, 15a, 15b, 15b, 15c and 15c are tightened to couple upper housing 13 to lower housing 14 in advance. The drilling work is implemented by drilling the positioning boss part 20 and each of leg parts 21, 22, 23 and 24 from the upper surfaces of distal end portions thereof downward in the vertical direction thereof.

Thereafter, each positioning pin 25 is inserted into corresponding positioning hole 8a through positioning boss part 20 and leg parts 21, 22, 23 and 24 under a condition that a lower part of each positioning pin 25 is pressed-fitted into press-fit holes 20a, 21c, 22c, 23c and 24c.

According to this assembling method, even if positioning boss part 20 and each of leg parts 21, 22, 23 and 24 are not accurately in the vertical direction of upper housing 13 but slightly inclined inwardly or outwardly with respect to the body of upper housing 13, positioning pins 25 can be fixed to press-fit holes 20a, 21c, 22c, 23c and 24c respectively in the vertical direction because press-fit holes 20a, 21c, 22c, 23c and 24c are formed in the vertical direction. As a result, each positioning pin 25 can be smoothly inserted into positioning hole 8a.

In this way, both housings 13 and 14 can be easily positioned at the lower part of cylinder block 1.

The present embodiment may be modified as follows. The inclined angles of positioning boss part 20 and leg parts 21, 22, 23 and 24 can be adjusted by a combination of a concavity and convexity on a junction surface of upper housing 13 and lower housing 14 and a tightening torque of each of tightening bolts 15a, 15a, 15b, 15b, 15c and 15c.

While a press-fit margin of each positioning pin 25 with respect to the corresponding one of press-fit holes 20a, 21c, 22c, 23c and 24c of positioning boss part 20 and leg parts 21, 22, 23 and 24, is increased to increase a press-fit force, the inner diameter of each positioning hole 8a of cylinder block 1 may be increased slightly. This serves to prevent each positioning pin 25 from being left in positioning hole 8a when balancer device 5 is disassembled from cylinder block 1.

The embodiment shows a case that balancer device 5 is directly assembled to cylinder block 1. However, a ladder frame may be provided at the lower part of cylinder block 1, wherein upper housing 13 is fixed to cylinder block 1 through the ladder frame.

The entire contents of Japanese Patent Application 2013-189932 filed Sep. 13, 2013 are incorporated herein by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A balancer device for an internal combustion engine, the balancer device comprising:
   an upper housing including a plurality of leg parts configured to be fixed to the internal combustion engine, wherein the upper housing is made of aluminum alloy;
   a lower housing configured to be coupled to the upper housing by a plurality of tightening bolts, wherein the lower housing is made of aluminum alloy;
   a balancer shaft disposed in an internal space formed between the upper housing and the lower housing, and rotatably supported through bearings with respect to the upper housing and the lower housing; and
   a positioning pin disposed at a distal end portion of each of the plurality of leg parts;
   wherein a distance between distal end portions of leg parts facing each other across the balancing shaft under a second condition that the tightening bolts are loosened becomes narrower than a distance under a first condition that the tightening bolts are tightened to couple the lower housing to the upper housing.

2. The balancer device as claimed in claim 1, wherein:
   the balancer shaft comprises a pair of balancer shafts;
   each of the balancer shafts includes a counter weight at an outer periphery thereof;
   the upper housing is provided with a first reinforcement rib; and
   the first reinforcement rib is located to correspond to the counter weights of the balancer shafts in an axial direction of the balancer shafts, and extend between the balancer shafts in a direction perpendicular to the axial direction of the balancer shafts.

3. The balancer device as claimed in claim 2, wherein the first reinforcement rib is located to correspond substantially to a central part of the counter weights of the balancer shafts in the axial direction.

4. The balancer device as claimed in claim 3, wherein the plurality of tightening bolts are located outside of the balancer shafts in the perpendicular direction and in different positions in the axial direction.

5. The balancer device as claimed in claim 2, wherein the first reinforcement rib is located at a part of the upper housing surrounded by the plurality of leg parts.

6. The balancer device as claimed in claim 2, wherein at least one of the tightening bolts is arranged between the pair of balancer shafts, and two of the tightening bolts are arranged on corresponding outsides of the balancer shafts.

7. The balancer device as claimed in claim 6, wherein the upper housing is provided with a second reinforcement rib at an outer end portion thereof in a direction in which the at least one and the two of the tightening bolts are arranged.

8. The balancer device as claimed in claim 7, wherein the second reinforcement rib is located close to one of the leg parts of the upper housing.

9. The balancer device as claimed in claim 7, wherein:
   a first one of the leg parts is arranged at a first outer end portion of the upper housing in a width direction of the upper housing;
   a second one of the leg parts is arranged at a second outer end portion of the upper housing in a width direction of the upper housing, wherein the second outer end portion is opposite to the first outer end portion; and
   the second reinforcement rib include a rib part located close to a side portion of the first leg part and a rib part located close to a side portion of the second leg part.

10. The balancer device as claimed in claim 1, wherein shifting from the second condition to the first condition causes the distance between the distal end portions of the leg parts facing each other across the balancer shaft to be changed by about 10 to 30 micrometers.

11. The balancer device as claimed in claim 1, wherein:
   a lower surface of a cylinder block of the internal combustion engine is provided with a bearing cap bearing a crankshaft; and
   the plurality of leg parts are configured to be fixed to portions of the cylinder block without interference with the bearing cap.

12. The balancer device as claimed in claim 1, wherein:
   a first one and a second one of the leg parts are arranged on a first side of a crankshaft;
   the first and second leg parts are arranged in different positions in an axial direction of the balancer shaft;
   a third one and a fourth one of the leg parts are arranged on a second side of the crankshaft opposite to the first side; and
   the third and fourth leg parts are arranged in different positions in the axial direction of the balancer shaft.

13. The balancer device as claimed in claim 1, wherein:
   each leg part includes a cylindrical hollow extending inside thereof in an axial direction thereof; and
   the upper housing is configured to be fixed to the internal combustion engine by mounting bolts, wherein each mounting bolt is inserted in the hollow of a corresponding one of the leg parts.

14. A balancer device for an internal combustion engine, the balancer device comprising:
   an upper housing including a plurality of leg parts configured to be fixed to the internal combustion engine, wherein the upper housing is made of aluminum alloy;
   a lower housing configured to be coupled to a lower part of the upper housing by a plurality of tightening bolts, wherein the lower housing is made of aluminum alloy;

a pair of balancer shafts disposed in an internal space formed between the upper housing and the lower housing, and rotatably supported with respect to the upper housing and the lower housing; and positioning members each of which is disposed at a distal end portion of a corresponding one of the leg parts, and configured to extend longitudinally of the corresponding leg part, and position the upper housing with respect to the internal combustion engine by positional correspondence to a corresponding positioning part of the internal combustion engine;

wherein at least a first one of the tightening bolts is disposed between the balancer shafts;

each positioning member is configured to correspond in position to the corresponding positioning part of the internal combustion engine under a first condition that the first tightening bolt is tightened; and at least one of the positioning members is configured to fail to correspond in position to the corresponding positioning part of the internal combustion engine under a second condition that the first tightening bolt is loosened.

15. An assembly method for a balancer device for an internal combustion engine, the balancer device including:

an upper housing including a plurality of leg parts configured to be fixed to the internal combustion engine, wherein the upper housing is made of aluminum alloy;

a lower housing configured to be coupled to a lower part of the upper housing by a plurality of tightening bolts, wherein the lower housing is made of aluminum alloy;

a balancer shaft disposed in an internal space formed between the upper housing and the lower housing, and rotatably supported with respect to the upper housing and the lower housing; and positioning pins each of which is disposed at a distal end portion of a corresponding one of the leg parts, and configured to extend longitudinally of the corresponding leg part, and position the upper housing with respect to the internal combustion engine by positional correspondence to a corresponding positioning hole of the internal combustion engine;

the assembly method comprising:

a first operation of coupling the lower housing to the upper housing by tightening the tightening bolts;

a second operation of drilling a press-fit hole in the distal end portion of each corresponding leg part, after the first operation; and a third operation of inserting each positioning pin into the corresponding positioning hole through the corresponding leg part, with holding a part of each positioning pin press-fitted in the corresponding press-fit hole, after the second operation.

* * * * *